United States Patent
Ayikkara et al.

(10) Patent No.: US 10,305,673 B1
(45) Date of Patent: May 28, 2019

(54) AUTOMATIC CLOCK PHASE SYNCHRONIZATION IN OTN MULTI-CHASSIS SYSTEM WITH FAIL OVER MECHANISM

(71) Applicant: Cisco Technology, Inc., San Jose, CA (US)

(72) Inventors: Nisha Ayikkara, Bangalore (IN); Piyush Jaju, Bangalore (IN); Rohith Sreenivasan, Bangalore (IN); Siddalingaprasad Kori, Cupertino, CA (US); Basavalinga Kullashetty, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/872,058

(22) Filed: Jan. 16, 2018

(51) Int. Cl.
*H04L 7/00* (2006.01)

(52) U.S. Cl.
CPC .......... *H04L 7/0012* (2013.01); *H04L 7/0037* (2013.01)

(58) Field of Classification Search
CPC ..... H04J 3/0658; H04J 3/0685; H04L 7/0008; H04L 7/0012; H04L 7/0037; H04W 56/0015
See application file for complete search history.

(56) References Cited

U.S. PATENT DOCUMENTS

| | | | | |
|---|---|---|---|---|
| 2014/0198810 A1* | 7/2014 | Jones | ..................... | H03L 7/0814 370/507 |
| 2015/0124655 A1* | 5/2015 | Saxena | ............... | H04L 41/0803 370/256 |
| 2016/0065322 A1* | 3/2016 | Cao | ........................ | H04J 3/0641 370/503 |
| 2016/0149692 A1* | 5/2016 | Kim | .................... | H04L 12/4625 370/503 |
| 2017/0366331 A1* | 12/2017 | Vermeulen | ............ | H04L 7/0008 |

OTHER PUBLICATIONS

Optical Internetworking Forum, "OTN Over Packet Fabric Protocol (OFP) Implementation Agreement," Nov. 2011, 40 pages.

* cited by examiner

*Primary Examiner* — David S Huang
(74) *Attorney, Agent, or Firm* — Patterson + Sheridan, LLP

(57) ABSTRACT

A method is disclosed for use by a network element comprising a plurality of ports for communicating a common clock signal with one or more neighboring network elements. The method comprises, for at least one port of the plurality of ports, determining, while the port is in a predefined listening mode, whether the port is connected with a neighboring network element; and calculating, when the port is connected, a respective clock phase delay value between the network element and the neighboring network element. The method further comprises, based on a role assigned to the network element from a plurality of predefined roles, assigning a clock signal synchronization role to the port. The network element is configured to communicate the common clock signal using the clock phase delay value and using the clock signal synchronization role.

20 Claims, 7 Drawing Sheets

AUTOMATIC CLOCK PHASE SYNCHRONIZATION IN OTN MULTI-CHASSIS SYSTEM WITH FAIL OVER MECHANISM

TECHNICAL FIELD

Embodiments presented in this disclosure generally relate to high-speed communications systems, and more specifically, techniques for automatic clock phase synchronization among network elements in a communication system.

BACKGROUND

In converged transport architectures, Ethernet frames (specifically, layer 2 or L2 Ethernet frames) are transparently transported using a wide range of optical-based transport networks, such as synchronous optical networking (SONET), Optical Transport Network (OTN, or Packet over Optical Channel Data Unit (ODU)), Dense Wavelength Division Multiplexing (DWDM), and so forth.

Protocols for the converged transport architectures can require a phase-locked reference clock that is common to multiple network elements. For example, in OTN Over Packet Fabric Protocol, a 311.04 megahertz (MHz) common reference clock is phase-locked to a common time-stamp synchronization pulse of 8 kilohertz (kHz). For an individual network element, maintaining phase synchronization may be achieved by controlling the clock signal routing delay skews. However, maintaining phase synchronization is more complex for a communication system having multiple network elements, which in some cases may require accuracy on the order of nanoseconds. For example, factors such as component variations and/or temperature variations of the different network elements, as well as the properties of cabling connecting the different network elements, can affect the amount of delay of the phase synchronization pulse.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
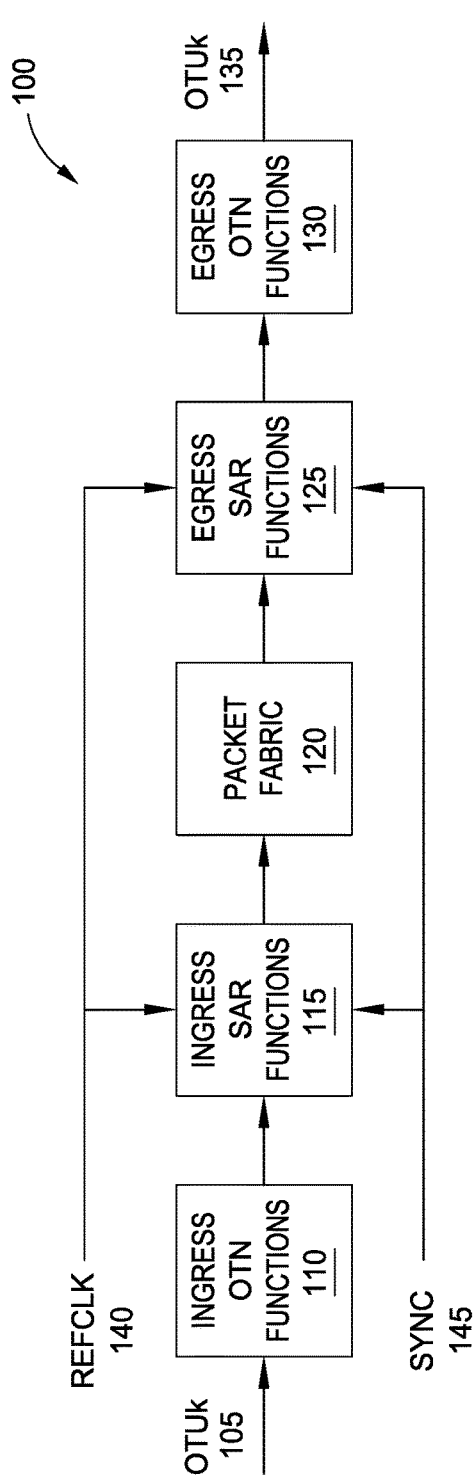
FIG. 1 illustrates an exemplary network element, according to embodiments described herein.

One embodiment presented in this disclosure is a method for use by a network element comprising a plurality of ports for communicating a common clock signal with one or more neighboring network elements. The method comprises, for at least one port of the plurality of ports: determining, while the port is in a predefined listening mode, whether the port is connected with a neighboring network element; and calculating, when the port is connected, a respective clock phase delay value between the network element and the neighboring network element. The method further comprises, based on a role assigned to the network element from a plurality of predefined roles, assigning a clock signal synchronization role to the port. The network element is configured to communicate the common clock signal using the clock phase delay value and using the clock signal synchronization role.

Another embodiment presented in this disclosure is a network element comprising a plurality of ports for communicating a common clock signal with one or more neighboring network elements, and one or more computer processors coupled with the plurality of ports. The one or more computer processors are configured to, for at least one port of the plurality of ports: determine, while the port is in a predefined listening mode, whether the port is connected with a neighboring network element; and calculate, when the port is connected, a respective clock phase delay value between the network element and the neighboring network element. The one or more computer processors are further configured to, based on a role assigned to the network element from a plurality of predefined roles, assign a clock signal synchronization role to the port. The network element is configured to communicate the common clock signal using the clock phase delay value and using the clock signal synchronization role.

Another embodiment presented in this disclosure is a non-transitory computer-readable medium having computer-readable program code embodied therewith, the computer-readable program code executable by one or more computer processors of a network element to perform an operation. The operation comprises, for at least one port of a plurality of ports for communicating a common clock signal with one or more neighboring network elements: determining, while the port is in a predefined listening mode, whether the port is connected with a neighboring network element; and calculating, when the port is connected, a respective clock phase delay value between the network element and the neighboring network element. The operation further comprises, based on a role assigned to the network element from a plurality of predefined roles, assigning a clock signal synchronization role to the port. The network element is configured to communicate the common clock signal using the clock phase delay value and using the clock signal synchronization role.

Example Embodiments

In various embodiments disclosed herein, a network element comprises a plurality of ports for communicating a common clock signal with one or more neighboring network elements, and one or more computer processors coupled with the plurality of ports. The one or more computer processors are configured to, for at least one port of the plurality of ports: determine, while the port is in a predefined listening mode, whether the port is connected with a neighboring network element; and calculate, when the port is connected, a respective clock phase delay value between the network element and the neighboring network element. In some cases, this may be performed for each port of the plurality of ports. The one or more computer processors are further configured to, based on a role assigned to the network element from a plurality of predefined roles, assign a clock signal synchronization role to the port. In some cases, this may also be performed for each port of the plurality of ports.

In this way, the network element can establish and/or maintain clock phase synchronization among a plurality of network elements with a desired accuracy (e.g., on the order of microseconds or nanoseconds). Additionally, a communication system comprising a plurality of network elements offers redundancy in the case of one or more link failures occurring between network elements.

Beneficially, no special packet protocol or complex software stack is required to implement the clock phase synchronization techniques disclosed herein. Despite the relative simplicity, the clock phase synchronization techniques can achieve suitably high accuracy while requiring only minimal additional logic to be included in the network elements. The redundancy between different network elements can be achieved without requiring user configuration, and failure handling can be performed automatically without requiring user intervention.

FIG. 1 illustrates an exemplary network element 100, according to embodiments described herein. Although the network element 100 is described herein as being configured to communicate using the OTN Over Packet Fabric Protocol, operation of the network element 100 using other protocols is also possible. The network element 100 may have any suitable implementation, such as a multilayer converged transport network element that is configured to provide both packet switching and optical switching functionalities.

The network element 100 generally comprises one or more computer processors that are configured to route and/or process network traffic, as well as a memory (which may include volatile and/or non-volatile memory elements). The network element 100 may further comprise various input/output (I/O) interfaces coupled with the one or more computer processors, such as electrical and/or optical network interfaces, interfaces for displays or user input devices, and so forth.

The functionality of the network element 100 may be implemented using hardware, software, firmware, or combinations thereof. For example, the network element 100 may be implemented as a computing device installed on a particular rack and/or chassis.

In the context of the OTN Over Packet Fabric Protocol, the network element 100 comprises ingress OTN functions 110, ingress segmentation and re-assembly (SAR) functions 115, a packet fabric 120, egress SAR functions 125, and egress OTN functions 130. The network element 100 is configured to receive a first optical signal (OTUk stream 105) as an input, the second optical signal (OTUk stream 135) as an output.

A common clock signal (140; REFCLK) and a synchronization pulse signal (145; SYNC) are provided to the ingress SAR functions 115 and the egress SAR functions 125. The common clock signal 140 and the synchronization pulse 145 may be derived from a common timing reference, and are phase locked with each other. As mentioned above, the OTN Over Packet Fabric Protocol uses a 311.04 MHz common clock signal 140 and an 8 kHz common synchronization pulse signal 145, but other signal frequencies are also possible.

The ingress OTN functions 110 comprise an OTUk framer configured to terminate the OTUk overhead, perform Forward Error Correction (FEC), and output the corresponding high-order ODUk stream. In some embodiments, the ingress OTN functions 110 further comprise one or more ODTUjk de-multiplexer stages, which extract low-order ODUj/ODUflex clients from the high-order ODUk carrier stream.

The ingress SAR functions 115 are configured to segment the high-order and/or the low-order streams into packets or cells, which are forwarded to the packet fabric 120. The packet fabric 120 switches the traffic, which is then reassembled by the egress SAR functions 125 back into ODU data streams that are processed by the egress OTN functions 130.

The egress OTN functions 130 are configured to adapt the high-order ODUk streams and add OTUk overhead and FEC checksum bytes to form the OTUk stream 135. In some embodiments, the egress OTN functions 130 are configured to multiplex the low-order ODUj/ODUflex streams into the high-order ODUk stream 135. In this way, the network element 100 is configured to preserve the timing integrity of the ODU streams from ingress to egress.

Additional information regarding the functionality of the network element 100 using the OTN Over Packet Fabric Protocol may be described within "OTN Over Packet Fabric Protocol (OFP) Implementation Agreement" published by Optical Internetworking Form, IA # OIF-OFP-01.0, November 2011, which is herein incorporated by reference. Further, alternate implementations of the network element 100 may include suitable functionality for operating using one or more alternate protocols.

Figure 2:
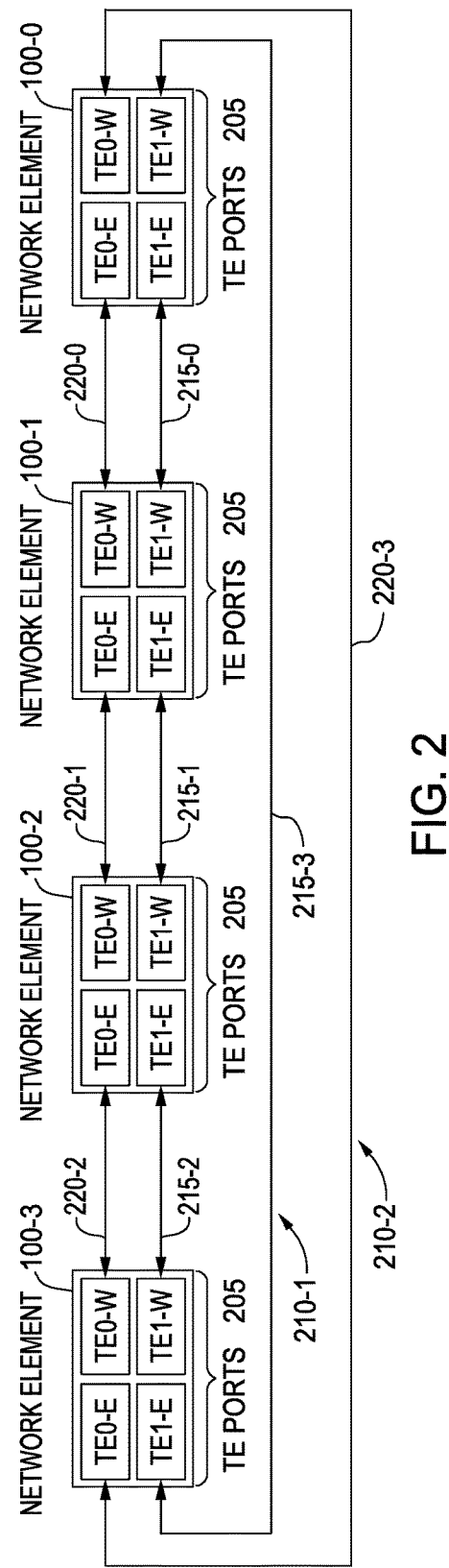
FIG. 2 is a diagram illustrating an exemplary communication system, according to embodiments described herein.

FIG. 2 is a diagram illustrating an exemplary communication system 200, according to embodiments described herein. The communication system 200 may be used in conjunction with other embodiments discussed herein. More specifically, the communication system 200 comprises a plurality of network elements 100-0, 100-1, 100-2, 100-3 (generically referred to as network element 100), each of which may include the functionality of network element 100 described with respect to FIG. 1.

Each network element 100 comprises four (4) timing expansion (TE) ports 205, wherein each TE port 205 is configured to communicate a common clock signal with one or more neighboring network elements 100. As shown, the four TE ports 205 of each network element 100 are arranged as two pairs of TE ports 205—a first pair comprises TE ports TE0-E, TE0-W, and a second pair comprises TE ports TE1-E, TE1-W. Each TE port 205 within each pair comprises a directional (or orientation) identifier, which indicates a direction for transmitting a common clock signal and therefore how the particular TE port 205 should be connected with a TE port 205 of the neighboring network element 100. In some embodiments, the directional identifier is selected from two predefined directions. As shown, the first pair comprises TE ports TE0-E having an "east" (E) direction identifier and TE port TE0-W having a "west" (W) direction identifier.

In some embodiments, the plurality of network elements 100 are communicatively coupled to form one or more clock loops 210-1, 210-2, wherein the common clock signal may be communicated to each of the network elements 100 using each of the clock loops 210-1, 210-2. In the clock loop 210-1, TE1-E of the network element 100-0 is connected with TE1 of the network element 100-1 using link 215-0, TE1-E of the network element 100-1 is connected with TE1-W of the network element 100-2 using link 215-1, TE1 of the network element 100-2 is connected with TE1 of the network element 100-3 using link 215-2, and TE1-E of the network element 100-3 is connected with TE1 of the network element 100-0 using link 215-3.

In the clock loop 210-2, TE0-E of the network element 100-0 is connected with TE0-W of the network element 100-1 using link 220-0, TE0-E of the network element 100-1 is connected with TE0-W of the network element 100-2 using link 220-1, TE0-E of the network element 100-2 is connected with TE0-W of the network element 100-3 using link 220-2, and TE0-E of the network element 100-3 is connected with TE0-W of the network element 100-0 using link 220-3.

The links 215-0, 215-1, 215-2, and 215-3 (generically referred to as link 215) and the links 220-0, 220-1, 220-2, and 220-3 (generically referred to as link 220) may each comprise one or more electrical conductors in an arrangement suitable for carrying the common clock signal between neighboring network elements 100. In one example, each TE port 205 comprises a RJ45 connector (also referred to as an 8 position 8 contact (8P8C) connector) and each link 215, 220 comprises Category 6 (twisted pair) cabling. Other types of connectors and/or cabling are also possible.

Within each of the clock loops 210-1, 210-2, the common clock signal may be communicated in either direction on a particular link 215, 220 depending on the configuration of the connected TE ports 205. In some embodiments, each of the TE ports 205 may be assigned a clock signal synchronization role selected from a plurality of roles. Some non-limiting examples of clock signal synchronization roles include a "master" role, a "backup" master role, an "alternate" master role, a "forwarding" role, and a "disabled" role.

In some embodiments, the TE ports 205 of the network elements 100 may be dynamically configured and/or reconfigured responsive to a link condition of the various links 215, 220. The configuration and/or reconfiguration may be performed automatically by the network element(s) 100, without requiring user intervention. For example, TE ports 205 connected by a link 215, 220 may have their clock signal synchronization roles adjusted responsive to determining that the link 215, 220 is degraded or has failed. In this way, the common clock signal may be dynamically rerouted to avoid one or more links 215, 220 that are experiencing performance issues.

While four network elements 100 are illustrated, alternate implementations of the communication system 200 may include alternate numbers of network elements 100. Further, while each network element 100 is illustrated as having four TE ports 205, alternate implementations of the network elements 100 may include alternate numbers of TE ports 205. Still further, while each of the TE ports 205 includes a directional identifier that is selected from two predefined directions (i.e., east or west), alternate implementations of the network element 100 may assign directional identifiers to the TE ports 205 from more than two predefined directions. Still further, while two clock loops 210-1, 210-2 are illustrated, and each clock loop 210-1, 210-2 includes each of the network elements 100, alternate implementations of the communication system 200 may include alternate numbers of clock loops and/or different compositions of the network elements 100 within different clock loops.

Figure 3:
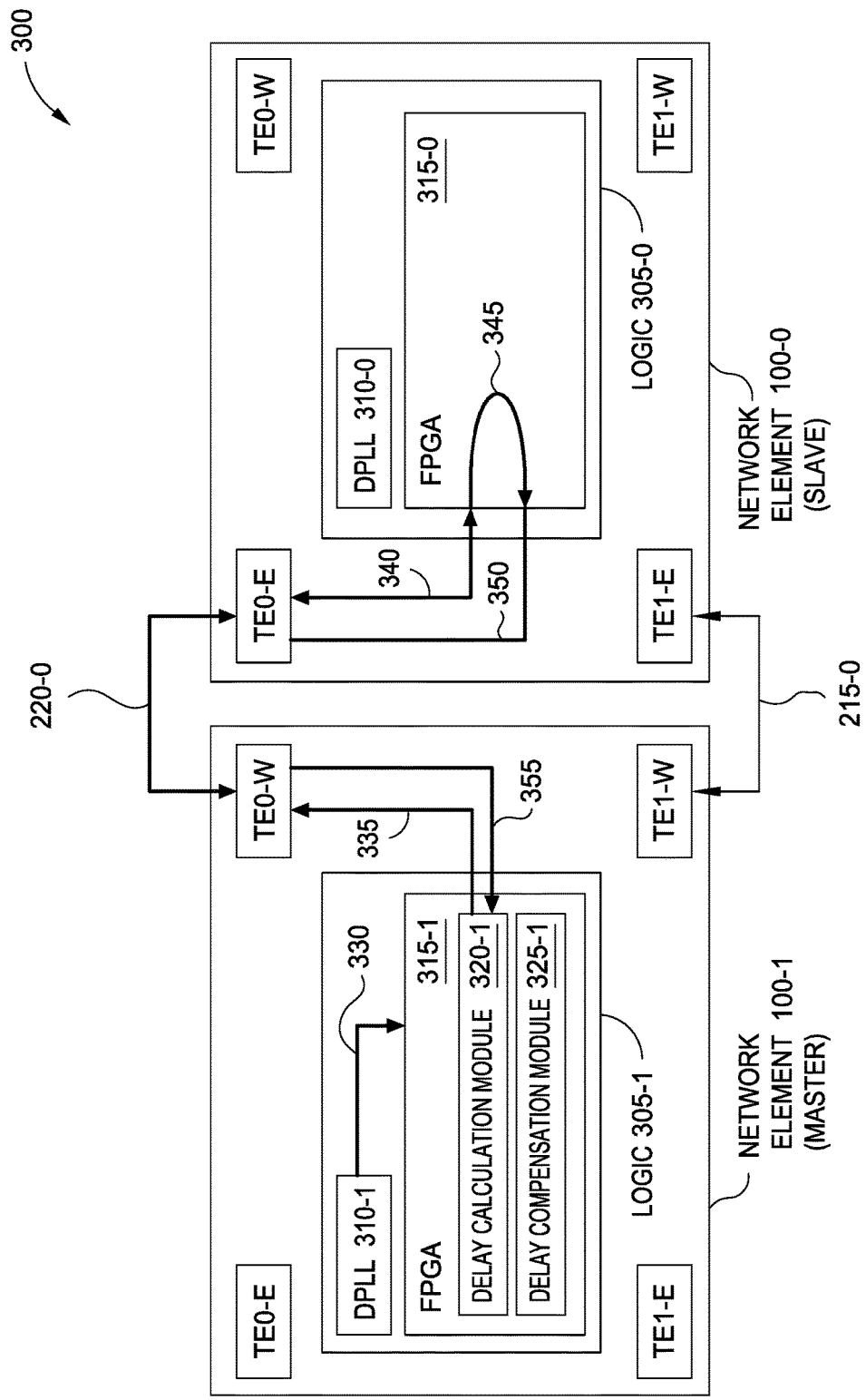
FIG. 3 is a diagram illustrating determining delay calculation between two network elements, according to embodiments described herein.

FIG. 3 is a diagram 300 illustrating determining delay calculation between two network elements, according to embodiments described herein. The process illustrated in diagram 300 may be used in conjunction with other embodiments disclosed herein, such as between neighboring network elements 100 of the communication system 200 depicted in FIG. 2.

The network element 100-0 comprises logic 305-0, and the network element 100-1 comprises logic 305-1. The logic 305-0, 305-1 may be implemented using hardware, software, firmware, or combinations thereof. The logic 305-0, 305-1 may be implemented in any suitable form, such as in a control card installed in the respective network element 100-0, 100-1.

The logic 305-0 comprises at least a first digital phase-locked loop (DPLL) 310-0 and a field-programmable gate array (FPGA) 315-0, and the logic 305-1 comprises at least a first DPLL 310-1 and a FPGA 315-1. Although not illustrated identically, the logic 305-0 may comprise the same or similar functionality as the logic 305-1. The FPGA 315-1 comprises a delay calculation module 320-1 and a delay compensation module 325-1.

During a predefined "listening" mode for the network element 100, the network element 100 may determine, for each port of the plurality of TE ports, whether the port is connected with a neighboring network element 100. The neighboring network element 100 and its connected port may be identified during the listening mode, using clock presence interrupts received from the neighboring network element 100. When the port is determined to be connected, the network element 100 uses the delay calculation module 320-1 to calculate a clock phase delay value for the link. The clock phase delay value is a function of at least the length of the cabling connecting the network elements 100.

In some embodiments, for performing the clock phase delay value calculation, a software application executing on one of the network elements 100-0, 100-1 assigns a master role to the network element 100-1, and a slave role to the network element 100-0. In some cases, assigning the roles to the different network elements 100-1, 100-2 may comprise transmitting control signals to one or both of the network elements 100-1, 100-2.

In some embodiments, a common clock signal 335 (such as the 8 kHz common synchronization pulse signal 145) is transmitted from the TE port TE0-W of the network element 100-1 to the TE port TE0-E of the network element 100-0.

The DPLL 310-1 of the network element 100-1 is configured to generate a first reference clock signal 330 and to transmit the first reference clock signal 330 to the FPGA 315-1. The first reference clock signal 330 may be highly stable and accurate depending on a reference oscillator of the DPLL 310-1. Based on the first reference clock signal 330, the FPGA 315-1 internally generates a second reference clock signal with a higher clock frequency than the first reference clock signal 330.

In one non-limiting example, and corresponding to an 8 kHz synchronization signal, the first reference clock signal 330 has a frequency of 25 MHz and the second reference clock signal has a frequency of 200 MHz. Other frequencies of the first reference clock signal 330 and/or the second reference clock signal are also possible. Notably, a higher frequency of the second reference clock signal corresponds to an increased accuracy of the clock phase delay calculation.

In some embodiments, the FPGA 315-1 comprises a counter that receives the second reference clock signal. For example, the counter may comprise a 32-bit timestamp counter corresponding to the 200 MHz frequency of the second reference clock signal. Other sizes of the counter are also possible, based on the frequency of the synchronization signal and/or the second reference clock signal 335.

In some embodiments, the FPGA 315-1 starts the counter responsive to starting transmission of the common clock signal 335 from TE0-W of network element 100-1 to TE0-E of network element 100-0 using link 220-0. The common clock signal 335 is received as received common clock signal 340 at the FPGA 315-0. Because the network element 100-0 is configured to operate in the slave role, the FPGA 315-0 is configured to loop back the received common clock signal 340 (illustrated as loop 345) as looped clock signal 350 over the link 220-0. When the received looped clock signal 355 is received by the FPGA 315-1, the delay calculation module 320-1 acquires a value of the counter.

The delay calculation module 320-1 is further configured to calculate the clock phase delay value using a mean acquired value of the counter. In some embodiments, acquiring the value of the counter occurs as a first instance, and the delay calculation module 320-1 is further configured to perform at least a second instance of acquiring the value of the counter responsive to receiving a looped-back common clock signal from the network element 100-0. In this way, the delay calculation module 320-1 may be configured to acquire a predefined number of values of the counter to calculate the clock phase delay value corresponding to the link 220-0. In one example using five acquired values of the counter, the clock phase delay value may be calculated according to:

$$\text{Phase delay} = \frac{(A0 + A1 + A2 + A3 + A4)/5}{2} \times \frac{1}{200 \text{ MHz}}, \quad (1)$$

where A0, A1, . . . A4 represent the five acquired values of the counter, and the 200 MHz represents the frequency of the second reference clock signal generated by the FPGA 315-1. Various delays that are included in the path (e.g., delays in the FPGAs 315-0, 315-1, a backplane routing delay, component propagation delays, and cabling delays) may be reflected in this calculated clock phase delay value.

Generally, the accuracy of the phase delay value measurement depends on the frequency at which the counter is operating. In this case, the phase delay value may be calculated with an accuracy of ±5 nanosecond (ns) for a clock frequency of 200 MHz. The accuracy of the phase delay value measurement may also be increased when the contribution of delay from the transmit path and the receive path is relatively balanced. To accomplish this, the logic 305-0, 305-1 may employ relatively simple logic elements in the FPGA 315-0, 315-1, as well as buffers and/or RS422 transceivers, which may beneficially avoid delays associated with packet processing.

Figure 4:
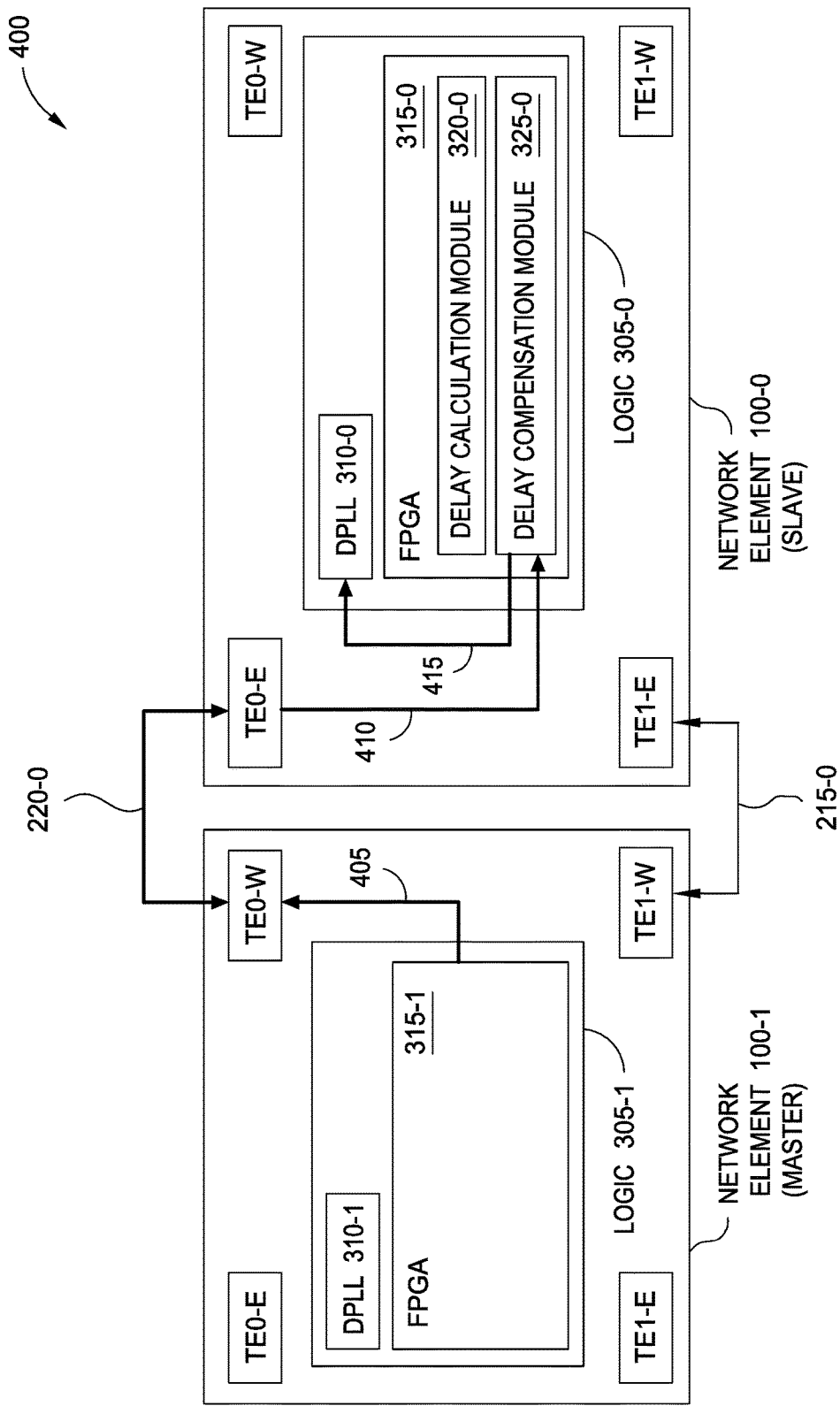
FIG. 4 is a diagram illustrating delay compensation between two network elements, according to embodiments described herein.

FIG. 4 is a diagram 400 illustrating delay compensation between two network elements, according to embodiments described herein. The process illustrated in diagram 400 may be used in conjunction with other embodiments disclosed herein, such as between neighboring network elements 100 of the communication system 200 depicted in FIG. 2.

In diagram 400, FPGA 315-0 comprises a delay calculation module 320-0 and a delay compensation module 325-0. The delay compensation module 325-0 is configured to implement the clock delay compensation(s) for the TE port(s) of the network element 100-0 (i.e., having the slave role).

The FPGA 315-1 is configured to transmit the common clock signal 405 from the TE port TE0-W of the network element 100-1 to the TE port TE0-E of the network element 100-0 using the link 220-0. The first DPLL 310-0 of the logic 305-0 is configured to receive the common clock signal 405 as received common clock signal 410, and to generate a first reference clock signal that is frequency synchronized to the received common clock signal 410.

In one non-limiting example, the first DPLL 310-0 generates the first reference clock signal with a 25 MHz frequency. The FPGA 315-0 is further configured to receive the first reference clock signal, and to internally generate a second reference clock signal with a frequency greater than the first reference clock signal. In one non-limiting example, the second reference clock signal has a 200 MHz frequency.

In some embodiments, the FPGA 315-0 comprises two counters that receive the second reference clock signal. For example, each of the two counters may comprise a 32-bit timestamp counter corresponding to the 200 MHz frequency of the second reference clock signal. Other sizes of the counters are also possible, based on the frequency of the received common clock signal 410 and/or the second reference clock signal.

In some embodiments, the FPGA 315-0 is configured to set each of the two counters with a predefined value, and to decrement each of the counters responsive to different properties of the received common clock signal 410. In one embodiment, the predefined value comprises a first period corresponding to the frequency of the received common clock signal 410, divided by a second period corresponding to the frequency of the second reference clock signal. For example, each of the counters may be set to the value [0x61A8-0x(Phase delay/5)], where 0x61A8 corresponds to a hexadecimal value of (125 us/5 ns). The 125 us value is the first period corresponding to an 8 kHz common clock signal being compensated, and the 5 ns value is the second period corresponding to the 200 MHz frequency of the second reference clock signal.

The FPGA 315-0 is configured to begin decrementing a first counter of the two counters from the predefined value responsive to a positive edge of the received common clock signal 410, and to begin decrementing a second counter of the two counters from the predefined value response to a negative edge of the received common clock signal 410. When the first counter decrements to a zero value, the FPGA 315-0 generates a positive edge of a phase-compensated clock signal 415. When the second counter decrements to a zero value, the FPGA 315-0 generates a negative edge of the phase-compensated clock signal 415. Responsive to decrementing to the zero value, the FPGA 315-0 resets each counter of the two counters to the predefined value, and repeats the decrementing process to generate subsequent transitions of the phase-compensated clock signal 415. The phase-compensated clock signal 415 is transmitted from the FPGA 315-0 to a second DPLL of the logic 305-0, and the network element 100-0 synchronizes to the phase-compensated clock signal 415.

Beneficially, the implementation illustrated in diagram 400 is relatively simple and does not require addressing packet protocols or using a complex software stack. Despite this simplicity, the implementation may achieve a high accuracy (e.g., within 10 ns). The implementation may use only minimal additional hardware logic, which reduces the cost and power consumption relative to alternate implementations. For example, achieving clock synchronization with a comparable accuracy is relatively complex and expensive using Precision Time Protocol (IEEE 1588) or Global Positioning System (GPS) time.

Figure 5:
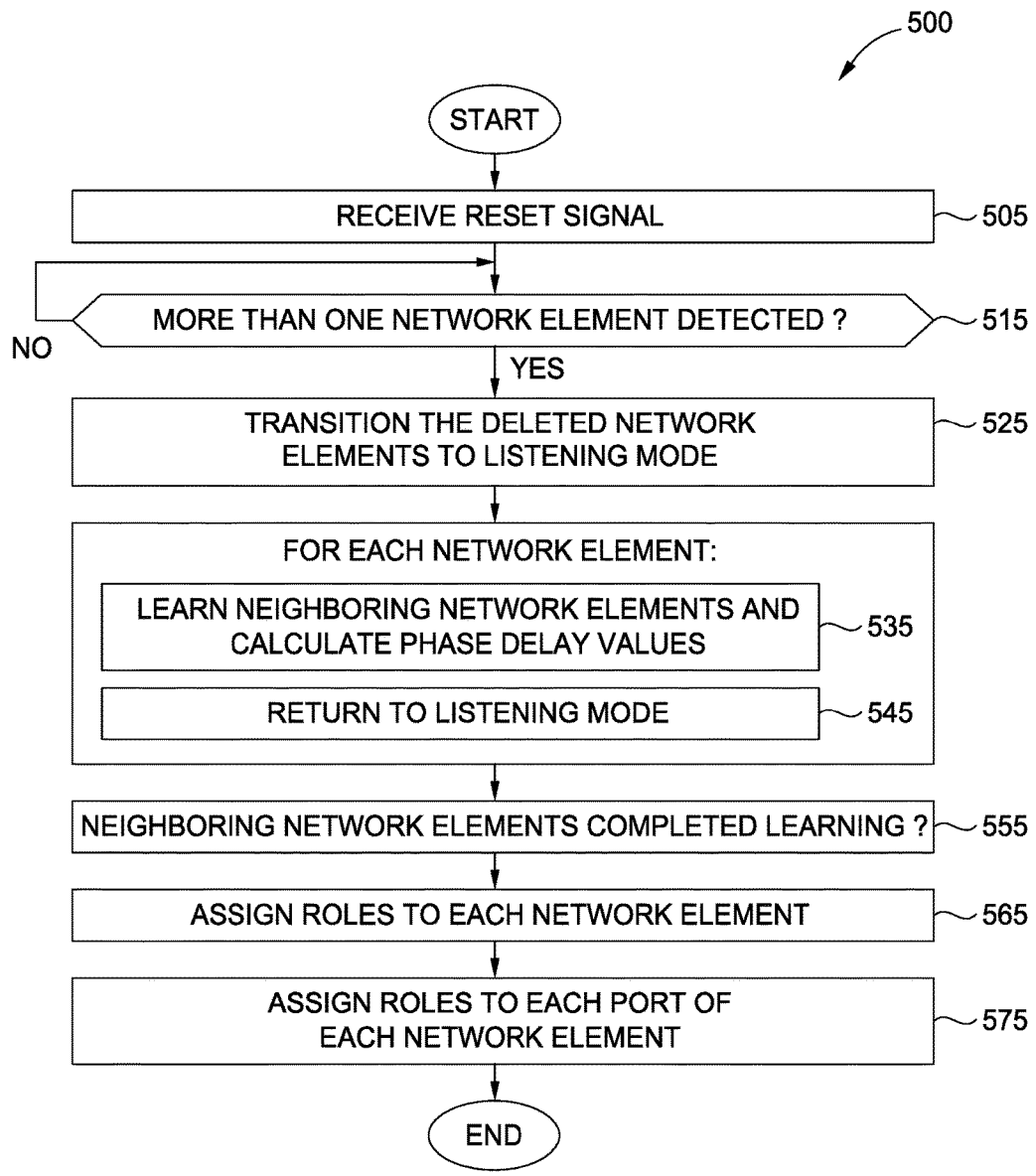
FIG. 5 is an exemplary method for configuring a communication system comprising a plurality of network elements, according to embodiments described herein.

FIG. 5 is an exemplary method 500 for configuring a communication system comprising a plurality of network elements, according to embodiments described herein. The method 500 may be used in conjunction with other embodiments disclosed herein, such as between neighboring network elements 100 of the communication system 200 depicted in FIG. 2. Logic used to perform the method 500 may be implemented in one or more network elements and/or a separate computing device communicatively coupled with the one or more network elements.

Method 500 begins at block 505, where the logic receives a reset signal. In some embodiments, each of the plurality of network elements is transitioned into an initialization mode responsive to the reset signal.

At block 515, the logic determines whether more than one network element is detected in the communication system. If only one network element is detected ("NO"), the method 500 returns to block 515. If more than one network element is detected ("YES"), the method 500 proceeds to block 525 and the logic transitions the detected network elements to a predefined listening mode. In some embodiments, each port of each of the network elements is transitioned into a predefined listening mode, in which a received common clock signal is looped back.

At block 535, a first network element learns one or more neighboring network elements, and calculates phase delay values for each of the one or more neighboring network elements. In some embodiments, the first network element transitions into a predefined learning mode while other network elements remain in the listening mode. In some embodiments, block 535 may be performed in conjunction with FIG. 3. At block 545, the first network element returns to the listening mode after the learning has been completed for a plurality of ports of the first network element. Blocks 535 and 545 may be repeated for each remaining network element.

At block 555, the logic determines whether the one or more neighboring network elements have completed learning. At block 565, the logic assigns roles to each network element. In some embodiments, one of the network elements is assigned as a clock master and remaining network elements are assigned as clock slaves or are isolated.

In some embodiments, the roles for each network element are assigned using one or more predefined criteria. In one embodiment, a quality value of a clock signal generated by each network element is compared. A network element having the largest quality value may be assigned the clock master role. In another embodiment, a first network element that is booted first is assigned the clock master role. In some cases, the first-booted network element may be selected when quality values are not determined or when the quality values do not sufficiently distinguish the different network elements. Other predefined criteria are also possible.

At block 575, the logic assigns roles to each port of each network element. Some non-limiting examples of the roles include a "master" role, a "backup" master role, an "alternate" master role, a "forwarding" role, and a "disabled" role. Method 500 ends following completion of block 575.

Figure 6:
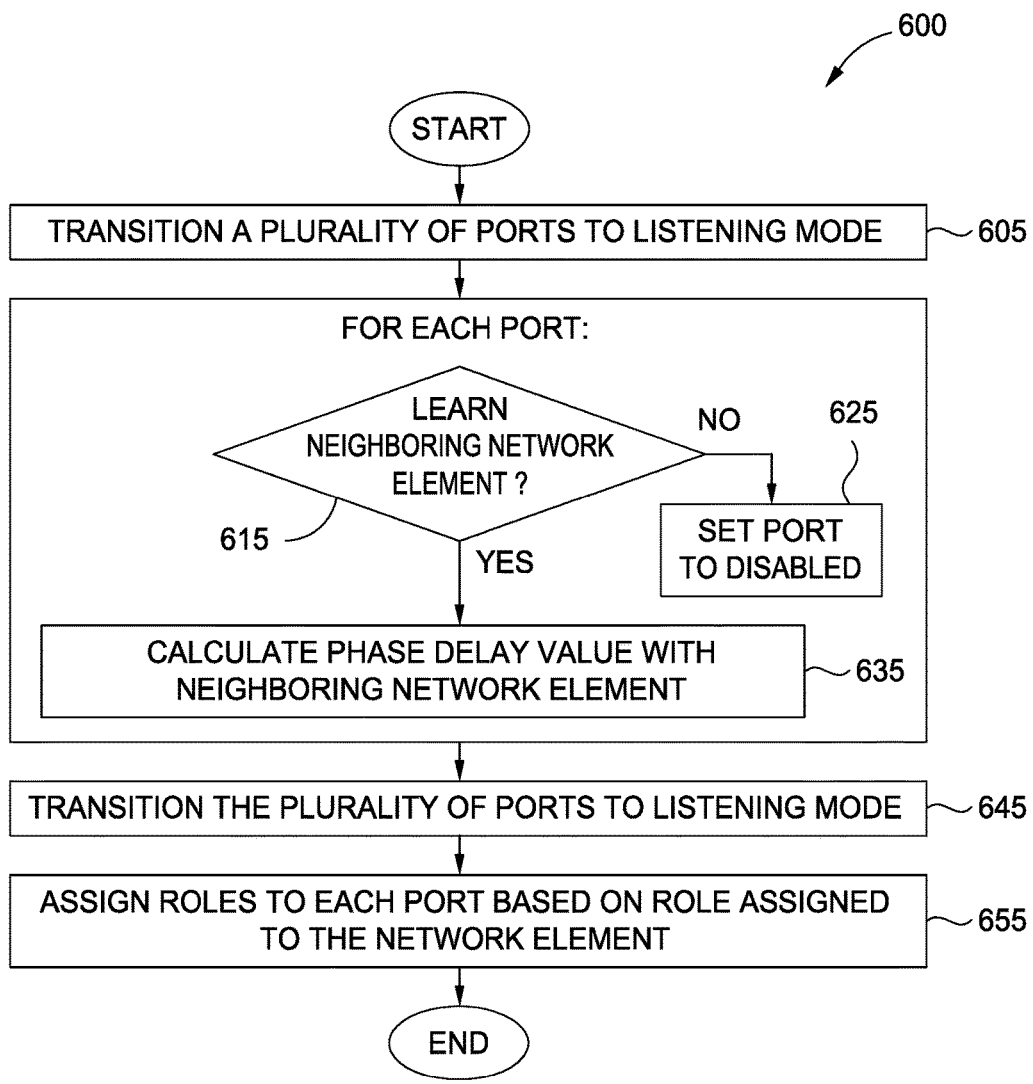
FIG. 6 is an exemplary method for configuring a network element within a communication system, according to embodiments described herein.

FIG. 6 is an exemplary method 600 for configuring a network element within a communication system, according to embodiments described herein. The method 600 may be used in conjunction with other embodiments, e.g., as part of the method 500 of FIG. 5 to configure a network element 100 of FIG. 1. In some embodiments, the network element comprises a plurality of ports.

Method 600 begins at block 605, where the network element transitions a plurality of ports to a predefined listening mode. At block 615, the network element determines whether a first port can learn a neighboring network element. In some embodiments, the network element transitions the first port into a predefined learning mode while the remaining ports remain in the listening mode. If the first port is unable to learn a neighboring network element ("NO"), the network element sets the first port to a disabled mode at block 625. If the first port does learn the neighboring network element ("YES"), the method 600 proceeds to block 635 and the network element calculates a phase delay value associated with the neighboring network element. Blocks 615, 625, and/or 635 may be repeated for each remaining port of the network element.

At block 645, the network element transitions the plurality of ports to the listening mode. At block 655, the network element assigns roles to each port based on the role assigned to the network element. In one non-limiting example, for a network element assigned a clock master role, each of the non-disabled ports may be assigned a "forwarding" role to enable the common clock signal to be transmitted from the ports of the network element. The assignment of port roles will be discussed further with respect to FIGS. 7-10. Method 600 ends following completion of block 655.

Figure 7:
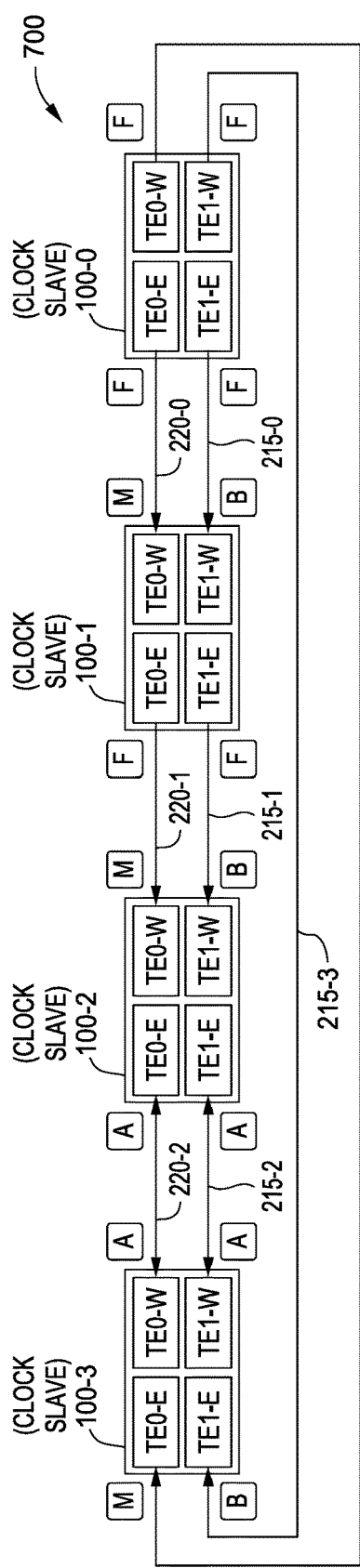
FIG. 7 is a diagram illustrating a synchronization state for a communication system, according to embodiments described herein.

FIG. 7 is a diagram 700 illustrating a synchronization state for a communication system, according to embodiments described herein. The implementation depicted in diagram 700 may be used in conjunction with other embodiments, e.g., using the communication system 200 depicted in FIG. 2. In some embodiments, the synchronization state is determined following completion of a learning process by the plurality of network elements according to method 500 (FIG. 5) and/or method 600 (FIG. 6).

In diagram 700, the network element 100-0 is assigned a clock master role, and the network elements 100-1, 100-2, and 100-3 are assigned clock slave roles. In some embodiments, the network element 100-0 when assigned a clock master role transitions each of its TE ports to a "forwarding" role (F) to transmit the common clock signal.

For each of the clock slave-assigned network elements 100-1, 100-2, 100-3, the first TE port in which the common clock signal is detected is assigned the "master" (M) role, and clock recovery is enabled on the first TE port. As shown, TE port TE0-W of the network element 100-1, and the TE port TE0-E of the network element 100-3 is transitioned to the master role.

On the clock slave-assigned network elements 100-1, 100-2, 100-3, when a second TE port receives the common clock signal after the first TE port has been assigned the master role, the second TE port is assigned a "backup master" (B) role. As shown, TE port TE1-W of the network element 100-1 and TE port TE1-E of the network element 100-3 are transitioned to the backup master role.

On the clock slave-assigned network elements 100-1, 100-2, 100-3, the two TE ports opposite to the first TE port (assigned the master role) are assigned a "forwarding" role. As shown, TE ports TE0-E and TE1-E of the network element 100-1 are transitioned to the forwarding role. For the network element 100-2, TE port TE0-W receives the common clock signal from the (forwarding) TE port TE0-E of the network element 100-1 on link 220-1, and TE0-W of the network element 100-2 is transitioned to a master role. The TE port TE1-W of the network element 100-2 is transitioned to a backup role.

The TE ports TE0-E and TE1-E of the network element 100-2, and TE0-W and TE1 of the network element 100-3 would typically be assigned a forwarding role due to their location opposite to the master role TE ports of network elements 100-2, 100-3. However, in addition to forwarding the common clock signal, each of these TE ports also receives the common clock signal, and each of these TE ports is assigned an "alternate master" (A) role.

Figure 8:
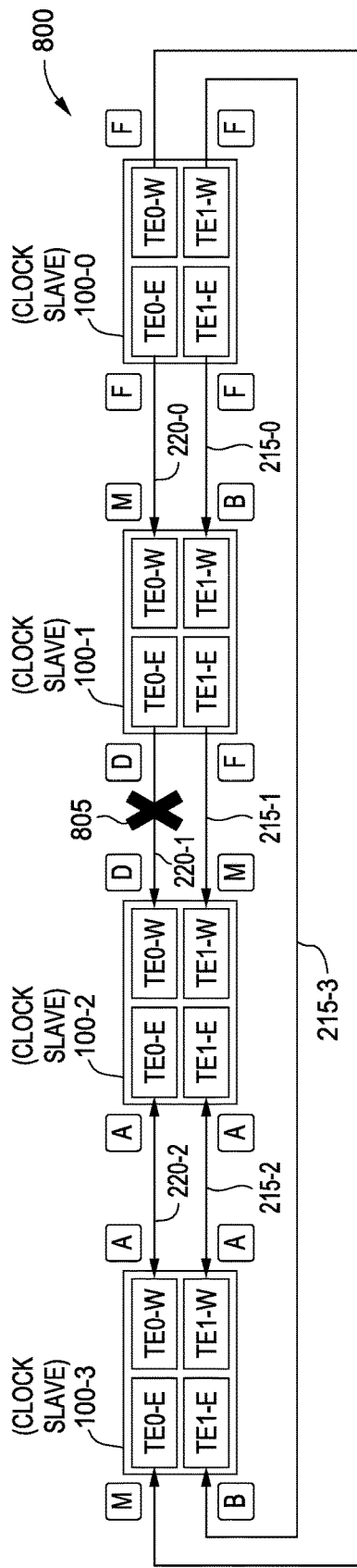
FIGS. 8-10 each illustrate an updated synchronization state for a communication system, according to embodiments described herein.
Figure 9:
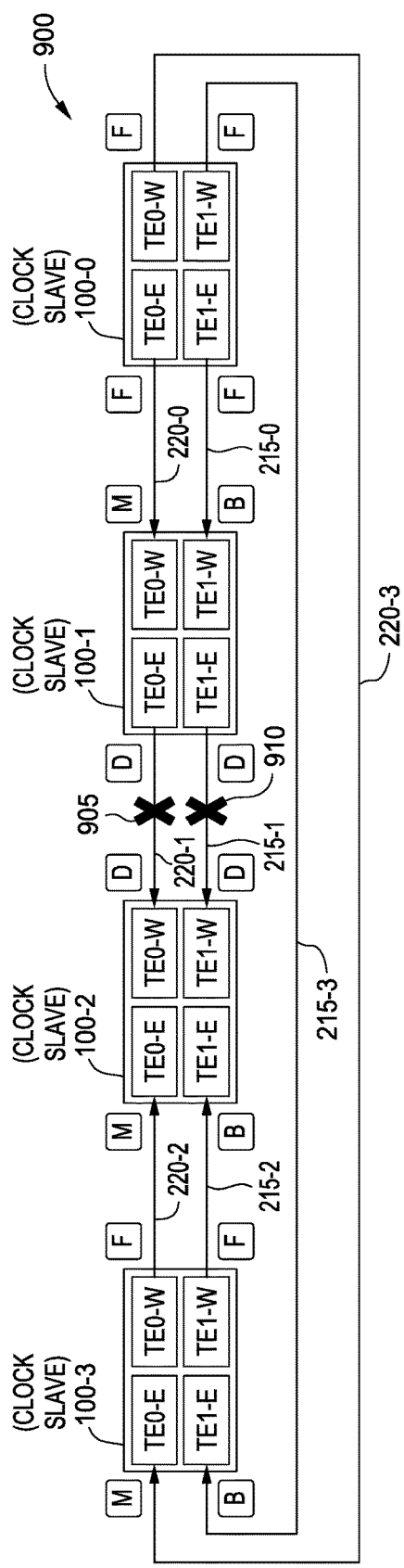
Figure 10:
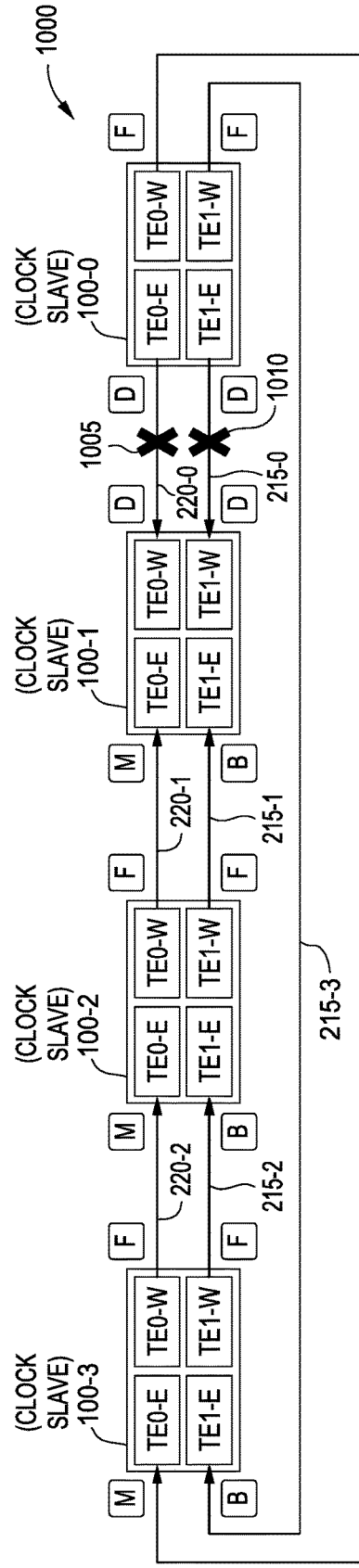

FIGS. 8-10 each illustrate an updated synchronization state for a communication system, according to embodiments described herein. In each of these Figures, the updated synchronization state may reflect a dynamic reconfiguration of the communication system responsive to a link degradation or failure.

FIG. 8 is a diagram 800 in which a single link 220-1 fails (indicated by a break 805). The TE port TE0-W of the network element 100-2 (previously assigned a master role) and the TE port TE0-E of the network element 100-1 (previously assigned a forwarding role) are both assigned a "disabled" (D) role. With the loss of the TE port TE0-W as having the master role for the network element 100-2, the TE port TE1-W of the network element 100-2 transitions from the backup master role to the master role, such that synchronization and delay compensation are enabled on TE port TE1-W.

FIG. 9 is a diagram 900 in which multiple links 215-1, 220-1 fail (indicated by respective breaks 905, 910). The TE ports TE0-W, TE1-W of the network element 100-2, and TE ports TE0-E, TE1-E of the network element 100-1 are each assigned a disabled role.

As both of the master role and the backup master role for the network element 100-2 are lost with the multiple link failures, the TE ports TE0-E, TE1-E having the alternate master role are transitioned to the master role and backup master role. As shown, TE port TE0-E is assigned the master role and the TE port TE1-E is assigned the backup master role. Further, as the TE ports TE0-W, TE1-W of the network element 100-3 no longer receive the common clock signal from the network element 100-2, the TE ports TE0-W, TE1 are transitioned from the alternate master role to the forwarding role.

FIG. 10 is a diagram 1000 in which multiple links 215-0, 220-0 fail (indicated by respective breaks 1005, 1010). The TE ports TE0-W, TE1 of the network element 100-1 and the TE ports TE0-E, TE1-E of the network element 100-0 are assigned a disabled role.

The TE ports TE0-W, TE1 of the network element 100-3 are transitioned to from the alternate master role to a forwarding role. The TE ports TE0-E, TE1-E of the network element 100-2 are transitioned from the alternate master role to the master role and backup master role, respectively. The TE ports TE0-W, TE1-W of the network element 100-2 disposed opposite the assigned master role and backup master role are transitioned to a forwarding role. The TE ports TE0-E, TE1-E of the network element 100-1 are transitioned from the forwarding role to the master role and the backup master role.

Although not shown, if the links fail that connected to the TE ports with the master role and the backup master role for a particular network element 100, and no TE ports within the communication system are assigned the alternate master role, any forwarding ports of the network element 100 are assigned a "waiting" role as the network element 100 does not receive the common clock signal for forwarding to neighboring network elements. Once the common clock signal is again received by the network element 100, the TE ports in the waiting role may be transitioned to the forwarding role.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for use by a network element comprising a plurality of ports for communicating a common clock signal with one or more neighboring network elements, the method comprising:

for at least one port of the plurality of ports:
determining, while the port is in a predefined listening mode, whether the port is connected with a neighboring network element;
calculating, when the port is connected, a respective clock phase delay value between the network element and the neighboring network element; and
based on a role assigned to the network element from a plurality of predefined roles, assigning a clock signal synchronization role to the port,
wherein the network element is configured to communicate the common clock signal using the clock phase delay value and using the clock signal synchronization role.

2. The method of claim 1, further comprising:
for the at least one port of the plurality of ports, transitioning the port into the predefined listening mode after calculating the respective clock phase delay value.

3. The method of claim 1, wherein the network element is assigned a master role, and wherein the port is assigned a forwarding clock signal synchronization role for forwarding the common clock signal.

4. The method of claim 1, wherein calculating the respective clock phase delay value comprises:
generating a first reference clock signal with a frequency greater than the common clock signal;
starting a counter of the network element responsive to starting transmission of the common clock signal to the neighboring network element, wherein the counter receives the first reference clock signal;
acquiring a value of the counter responsive to receiving the common clock signal looped back from the neighboring network element; and
calculating the clock phase delay value using a mean acquired value of the counter.

5. The method of claim 4, further comprising:
generating a second reference clock signal using a digital phase-locked loop of the network element,
wherein the second reference clock signal is generated based on the first reference clock signal.

6. The method of claim 4, wherein acquiring the value of the counter occurs as a first instance, the method further comprising:
performing at least a second instance of acquiring the value of the counter responsive to receiving the common clock signal looped back from the neighboring network element,
wherein the clock phase delay value is calculated using the values of the counter acquired during the first instance and the second instance.

7. The method of claim 1, further comprising:
receiving the common clock signal from the neighboring network element;

generating a first reference clock signal with a frequency greater than the common clock signal, wherein the first reference clock signal is frequency synchronized with the common clock signal;

responsive to a positive edge of the common clock signal, beginning decrementing a first counter from a predefined value using the first reference clock signal;

responsive to a negative edge of the common clock signal, beginning decrementing a second counter from the predefined value using the first reference clock signal;

generating a positive edge of a compensated clock signal when the first counter decrements to a zero value; and generating a negative edge of the compensated clock signal when the second counter decrements to a zero value.

8. The method of claim 7, further comprising:
generating a second reference clock signal using a first digital phase-locked loop of the network element,
wherein the second reference clock signal is generated based on the first reference clock signal.

9. The method of claim 8, wherein generating the positive edge of the compensated clock signal and generating the negative edge of the compensated clock signal is performed using a second digital phase-locked loop of the network element.

10. The method of claim 7, wherein the predefined value comprises a first period corresponding to a frequency of the common clock signal, divided by a second period corresponding to the frequency of the first reference clock signal.

11. A network element comprising:
a plurality of ports for communicating a common clock signal with one or more neighboring network elements; and
one or more computer processors coupled with the plurality of ports and configured to:
for at least one port of the plurality of ports:
determine, while the port is in a predefined listening mode, whether the port is connected with a neighboring network element;
calculate, when the port is connected, a respective clock phase delay value between the network element and the neighboring network element; and
based on a role assigned to the network element from a plurality of predefined roles, assign a clock signal synchronization role to the port,
wherein the network element is configured to communicate the common clock signal using the clock phase delay value and using the clock signal synchronization role.

12. The network element of claim 11, wherein the one or more computer processors are further configured to:
for the at least one port of the plurality of ports, transition the port into the predefined listening mode after calculating the respective clock phase delay value.

13. The network element of claim 11, wherein the network element is assigned a master role, and wherein the port is assigned a forwarding clock signal synchronization role for forwarding the common clock signal.

14. The network element of claim 11, wherein calculating the respective clock phase delay value comprises:
generating a first reference clock signal with a frequency greater than the common clock signal;
starting a counter of the network element responsive to starting transmission of the common clock signal to the neighboring network element, wherein the counter receives the first reference clock signal;
acquiring a value of the counter responsive to receiving the common clock signal looped back from the neighboring network element; and
calculating the clock phase delay value using a mean acquired value of the counter.

15. The network element of claim 14, wherein the one or more computer processors are further configured to:
generate a second reference clock signal using a digital phase-locked loop of the network element,
wherein the second reference clock signal is generated based on the first reference clock signal.

16. The network element of claim 14, wherein acquiring the value of the counter occurs as a first instance, and wherein the one or more computer processors are further configured to:
perform at least a second instance of acquiring the value of the counter responsive to receiving the common clock signal looped back from the neighboring network element,
wherein the clock phase delay value is calculated using the values of the counter acquired during the first instance and the second instance.

17. The network element of claim 11, wherein the one or more computer processors are further configured to:
receive the common clock signal from the neighboring network element;
generate a first reference clock signal with a frequency greater than the common clock signal, wherein the first reference clock signal is frequency synchronized with the common clock signal;
responsive to a positive edge of the common clock signal, begin decrementing a first counter from a predefined value using the first reference clock signal;
responsive to a negative edge of the common clock signal, begin decrementing a second counter from the predefined value using the first reference clock signal;
generate a positive edge of a compensated clock signal when the first counter decrements to a zero value; and
generate a negative edge of the compensated clock signal when the second counter decrements to a zero value.

18. The network element of claim 17, wherein the one or more computer processors are configured to:
generate a second reference clock signal using a first digital phase-locked loop of the network element,
wherein the second reference clock signal is generated based on the first reference clock signal.

19. The network element of claim 18, wherein generating the positive edge of the compensated clock signal and generating the negative edge of the compensated clock signal is performed using a second digital phase-locked loop of the network element.

20. A non-transitory computer-readable medium having computer-readable program code embodied therewith, the computer-readable program code executable by one or more computer processors of a network element to perform an operation that comprises:
for at least one port of a plurality of ports for communicating a common clock signal with one or more neighboring network elements:
determining, while the port is in a predefined listening mode, whether the port is connected with a neighboring network element;
calculating, when the port is connected, a respective clock phase delay value between the network element and the neighboring network element; and based on a role assigned to the network element from a plurality of predefined roles, assigning a clock signal synchronization role to the port, wherein the network element is configured to communicate the common clock signal using the clock phase delay value and using the clock signal synchronization role.

* * * * *

UNITED STATES PATENT AND TRADEMARK OFFICE
CERTIFICATE OF CORRECTION

PATENT NO. : 10,305,673 B1
APPLICATION NO. : 15/872058
DATED : May 28, 2019
INVENTOR(S) : Nisha Ayikkara et al.

It is certified that error appears in the above-identified patent and that said Letters Patent is hereby corrected as shown below:

In the Specification

In Column 5, Line 14, delete "TE1" and insert -- TE1-W --, therefor.

In Column 5, Line 16, delete "TE1" and insert -- TE1-E --, therefor.

In Column 5, Line 17, delete "TE1" and insert -- TE1-W --, therefor.

In Column 5, Line 19, delete "TE1" and insert -- TE1-W --, therefor.

In Column 11, Line 9, delete "TE1" and insert -- TE1-W --, therefor.

In Column 11, Line 46, delete "TE1" and insert -- TE1-W --, therefor.

In Column 11, Line 51, delete "TE1" and insert -- TE1-W --, therefor.

In Column 11, Line 54, delete "TE1" and insert -- TE1-W --, therefor.

Signed and Sealed this
Twenty-seventh Day of August, 2019

Andrei Iancu
*Director of the United States Patent and Trademark Office*